US012594621B2

(12) United States Patent
   Couedic

(10) Patent No.: US 12,594,621 B2
(45) Date of Patent: Apr. 7, 2026

(54) DEVICE AND METHOD FOR INSPECTING LASER WELDING PROTECTIVE GLASS

(71) Applicant: Autoliv Development AB, Vargarda (SE)

(72) Inventor: Gilbert Couedic, Briec (FR)

(73) Assignee: Autoliv Development AB, Vargarda (SE)

(*) Notice: Subject to any disclaimer, the term of this patent is extended or adjusted under 35 U.S.C. 154(b) by 513 days.

(21) Appl. No.: 17/270,226

(22) PCT Filed: Aug. 19, 2019

(86) PCT No.: PCT/EP2019/072095
   § 371 (c)(1),
   (2) Date: Mar. 17, 2021

(87) PCT Pub. No.: WO2020/038863
   PCT Pub. Date: Feb. 27, 2020

(65) Prior Publication Data
   US 2021/0299783 A1     Sep. 30, 2021

(30) Foreign Application Priority Data

Aug. 22, 2018    (FR) ...................................... 1857582

(51) Int. Cl.
   B23K 26/03          (2006.01)
   B23K 26/00          (2014.01)
   (Continued)

(52) U.S. Cl.
   CPC .......... B23K 26/03 (2013.01); B23K 26/0006 (2013.01); B23K 26/16 (2013.01);
   (Continued)

(58) Field of Classification Search
   CPC .... B23K 26/03; B23K 26/0006; B23K 26/16; B23K 26/702; B23K 26/707;
   (Continued)

(56) References Cited

U.S. PATENT DOCUMENTS 9,116,131 B2    8/2015  Jurca
9,511,450 B2    12/2016  Weick
   (Continued)

FOREIGN PATENT DOCUMENTS

CN    105598580 A    *   5/2016    ........... B23K 26/032
CN    107421966 A    *  12/2017    ............ G01B 11/00
   (Continued)

OTHER PUBLICATIONS

J. Skala et al., "Active thermography inspection of protective glass contamination on laser scanning heads", Sep. 27, 2016, Applied Optics, vol. 55, No. 34, pp. D60-D66 (Year: 2016).*

*Primary Examiner* — Michael P LaPage
*Assistant Examiner* — Joshua M Carlson
(74) *Attorney, Agent, or Firm* — Harness, Dickey & Pierce, P.L.C.

(57) ABSTRACT

An optical inspection device designed for testing an optical component such as a protective glass, an optical transmission system of a welding laser beam having a laser wavelength, comprising:
   a light source designed to emit a test light,
   receiving means designed to receive at least a portion of the test light and to quantify at least one quantity of the received light,
   means for holding the optical component designed to position the optical component between the light source and the receiving means, characterized in that:
   (Continued)

the portion of the test light received by the receiving means has a wavelength at ±20% of the laser wavelength.

5 Claims, 1 Drawing Sheet

(51) Int. Cl.

| | | |
|---|---|---|
| *B23K 26/16* | (2006.01) | |
| *B23K 26/70* | (2014.01) | |
| *G01N 21/3563* | (2014.01) | |
| *G01N 21/94* | (2006.01) | |
| *G01N 21/958* | (2006.01) | |

(52) U.S. Cl.
CPC .......... *B23K 26/702* (2015.10); *B23K 26/707* (2015.10); *G01N 21/3563* (2013.01); *G01N 21/94* (2013.01); *G01N 21/958* (2013.01); *G01N 2201/061* (2013.01)

(58) Field of Classification Search
CPC ............ G01N 21/3563; G01N 21/958; G01N 2201/061; G01N 2021/8845; G01N 21/94
See application file for complete search history.

(56) References Cited

U.S. PATENT DOCUMENTS

| | | | | |
|---|---|---|---|---|
| 9,529,079 | B1 * | 12/2016 | Droz ........................ | G01S 7/484 |
| 2005/0236589 | A1 * | 10/2005 | Brunfeld ........... | G01N 21/9501 |
| | | | | 250/559.11 |
| 2013/0010175 | A1 * | 1/2013 | Pichon ................ | G01N 21/896 |
| | | | | 348/335 |
| 2013/0141715 | A1 * | 6/2013 | Urano .................... | G01N 21/94 |
| | | | | 356/237.2 |
| 2013/0258321 | A1 | 10/2013 | Jurca | |
| 2014/0224780 | A1 | 8/2014 | Chida et al. | |
| 2015/0177160 | A1 * | 6/2015 | Zoeller, III ........ | G01N 21/8806 |
| | | | | 356/521 |

FOREIGN PATENT DOCUMENTS

| | | | | | |
|---|---|---|---|---|---|
| DE | 29903385 | U1 | | 5/1999 | |
| DE | 10113518 | A1 | | 10/2002 | |
| DE | 20314918 | U1 | | 2/2005 | |
| DE | 102007003023 | A1 | | 7/2008 | |
| DE | 102011007176 | A1 | | 10/2012 | |
| EP | 2687317 | A1 | | 1/2014 | |
| JP | 2004340680 | A | * | 12/2004 | ............ G01B 11/02 |
| WO | WO-9959762 | A1 | * | 11/1999 | .......... B23K 26/422 |
| WO | 2005/030433 | A1 | | 4/2005 | |
| WO | WO-2014189624 | A1 | * | 11/2014 | ........ B01L 3/502761 |
| WO | WO-2017061342 | A1 | * | 4/2017 | ............. G01N 21/47 |
| WO | WO-2019106992 | A1 | * | 6/2019 | ........ G01N 21/3563 |

* cited by examiner

DEVICE AND METHOD FOR INSPECTING LASER WELDING PROTECTIVE GLASS

The present invention generally relates to a device and a method for inspecting an optical component of an optical transmission system of a laser beam, and in particular the invention relates to a device and a method for inspecting a laser welding protective glass.

Laser welding devices typically comprise a laser source for emitting a laser beam, and one or more lenses forming an optical path that makes it possible to direct and/or focus the laser beam onto a welding zone, in order to weld components, for example of metal. The welding operation typically generates smoke and/or projections of molten material, making it necessary to provide a protective glass between the welding zone and the last lens of the optical path, in order to avoid damage to the lens by the smoke and/or molten material (otherwise known as spatter). However, the protective glass which may or may not have a surface treatment such as anti-reflection treatment is therefore directly exposed to such smoke and projections, and this protective glass can be made opaque by the deposits of smoke or projections of molten material. Consequently, the quality of the weld can be affected if the protective glass does not transmit the laser beam particularly well.

Furthermore, it is complicated to test the transparency of a laser welding protective glass, and the inventors of the present invention have been confronted with the difficulty of being able to reliably distinguish a protective glass that is too opaque after a certain time of use, whether it has been cleaned or not, in order to be able to continue to be used, from another protective glass that is somewhat opaque but can still be used without affecting the quality of weld.

A purpose of the present invention is to address the disadvantages of the prior art mentioned above, and in particular, primarily to propose a device and a method for inspecting a protective glass of a laser welding device that makes it possible to reliably verify whether the protective glass should be changed, or if it can continue to be used without creating welding defects.

For this purpose, a first aspect of the invention relates to a device for inspecting the laser welding protective glass, the inspection device comprising:

a light source designed to emit a test light, receiving means designed to receive at least a portion of the test light and to quantify at least one quantity of the received light, means for holding the protective glass designed to position the protective glass between the light source and the receiving means, characterized in that:

the portion of the test light received by the receiving means has a wavelength of between 855 nm and 1276 nm, preferably between 955 nm and 1170 nm, and still more preferentially between 1010 nm and 1110 nm, and very preferentially between 1040 nm and 1080 nm. Such wavelength range makes it possible to quantify the characteristics of the protective glass depending on the use in the welder, in order to make a representative measurement.

In other words, the invention relates to a device for inspecting a laser welding protective glass, the laser welder comprising a laser source having a laser wavelength, the inspection device comprising:

a light source designed to emit a test light, receiving means designed to receive at least a portion of the test light and to quantify at least one quantity of the received light, means for holding the protective glass designed to position the protective glass between the light source and the receiving means, characterized in that:

the portion of the test light received by the receiving means has a wavelength at ±20% of the laser wavelength. Thus, the light exposure is representative of use in the laser welder, and the measurement of the light transmission capacity is performed within a range of wavelengths representative of actual use.

In other words, the invention relates to an optical inspection device designed to test an optical component of an optical transmission system of a welding laser beam having a laser wavelength, comprising:

a light source designed to emit a test light, reception means designed to receive at least a portion of the test light and to quantify at least one quantity of the received light, means for holding the optical component designed to position the optical component between the light source and the receiving means, characterized in that:

the portion of the test light received by the receiving means has a wavelength at ±20% of the laser wavelength. Thus, the light exposure is representative of use in the laser welder, and the measurement of the light transmission capacity is performed within a range of wavelengths representative of actual use. In the remainder of the present application, the optical component is a laser welding protective glass, but the optical component can be a lens, a mirror or any member of the welder that transmits or reflects light.

In general, the inspection device is a device distinct from the welding equipment. Thus, optical components can be tested without immobilizing the production welding equipment. In particular, the light source of the inspection device is not that of the laser welder, and the holding means are not part of the laser welder.

Moreover, if the optical component is not a mirror, then it is spatially arranged between the light source and the receiving means. Consequently, the test light passes completely through the optical component to be verified. If there are for example completely opaque impurities on the surface of the optical component, a shadow will be measured on the receiving means, and not a reflection. This guarantees a better contrast and better final detection.

In particular, if the optical component is transparent and comprises an anti-reflection treatment on one or both faces, then the light will pass completely through the anti-reflection treatment and be received by the receiving means. The applicant has found that the integrity of the anti-reflection treatments is an important parameter to guarantee a good quality weld.

In particular, the light source is positioned relative to the optical component like the welding light source of the laser welder, and the receiving means are positioned relative to the optical component like the part to be welded. Thus, the test involves the portions of the optical component through which the welding light passes: the working parts.

According to a typical and advantageous embodiment, the light source and the receiving means are located on an axis of symmetry or a central axis of the optical component. This implementation simplifies the calculations and is free of reflections. Indeed, measuring fouling by reflection can easily lead to errors of interpretation because in particular the reflectivity of the impurities or smoke is not repeatable (based on their composition, which depends on the property of the parts, vaporized residue, shape of the impurity, etc. . . . ).

US 12,594,621 B2

3

The test light received by the receiving means has a wavelength between 855 nm and 1276 nm, preferably between 955 nm and 1170 nm, and still more preferentially between 1010 nm and 1110 nm, and very preferentially between 1040 nm and 1080 nm, which represents a small part of the infrared spectrum. In fact, in the optical and photonic range, the infrared spectrum is typically within a wavelength range from 700 nm to 5,000,000 nm. Consequently, the range from 855 nm to 1276 nm represents about 0.008% of the total range of the infrared radiation.

Advantageously, the inspection device comprises at least one optical filter arranged between the light source and the receiving means, and is designed to allow to pass to the receiving means only or exclusively the test light of a wavelength between 855 nm and 1276 nm, preferably between 955 nm and 1170 nm, and still more preferentially between 1010 nm and 1110 nm, and very preferentially between 1040 nm and 1080 nm. Ideally, the optical filter is provided to have a bandwidth of 12 nm±2 nm and centered on a wavelength of the preferred range, meaning that the wavelength of the light waves reaching the receiving means is for example between 1058 nm and 1070 nm if the bandwidth is centered on 1064 nm. In other words, the bandwidth of the optical filter has a width of 1.2% of the wavelength of the laser beam of the laser source of the welder.

Advantageously, the optical filter is arranged between the protective glass and the receiving means.

Alternatively or additionally, the, or another, optical filter is arranged between the light source and the protective glass. This makes it possible to expose the protective glass only to light representative of the working conditions thereof.

Advantageously or alternatively, the test light emitted by the light source has a wavelength between 855 nm and 1276 nm, preferably between 955 nm and 1170 nm, and still more preferentially between 1010 nm and 1110 nm, and very preferentially between 1040 nm and 1080 nm.

Advantageously, the light source emits light the wavelength whereof is only or exclusively between 855 nm and 1276 nm, preferably between 955 nm and 1170 nm, and still more preferentially between 1010 nm and 1110 nm, and very preferentially between 1040 nm and 1080 nm.

Advantageously, the test light has a light spectrum at least 80% of which falls within a range of values of +20% of the laser wavelength.

Advantageously, the test light has a light spectrum at least 80% of which has a wavelength between 855 nm and 1276 nm, preferably between 955 nm and 1170 nm, and still more preferentially between 1010 nm and 1110 nm, and very preferentially between 1040 nm and 1080 nm.

In other words, 80% of the electromagnetic waves emitted by the light source have a wavelength falling within a range of values of +20% of the laser wavelength, and/or between 855 nm and 1276 nm, preferably between 955 nm and 1170 nm, and still more preferentially between 1010 nm and 1110 nm, and very preferentially between 1040 nm and 1080 nm.

Advantageously, the light source comprises an electroluminescent diode. This allows an optical inspection device to be constructed that does not require special conditions of use, as can be the case for using laser devices.

Advantageously, the protective glass is separated from the light source by a distance falling within a range of values of 50 mm to 120 mm, and more preferentially from 70 mm to 100 mm.

Advantageously, the receiving means comprise a sensor with a measuring surface, and the protective glass is separated from the receiving means by a distance defined so as to allow a focusing of the receiving means on the protective glass, and in such a way that an image of the protective glass on the receiving means occupies at least 80% of the measuring surface, and preferentially at least 90% of the measuring surface. This enables an overall measurement to be made.

Advantageously, the sensor is a CMOS (Complementary Metal Oxide Semiconductor), which is composed of photodiodes, similar to a CCD, where each photosite has its own charge/voltage converter and amplifier (in the case of an APS sensor). Even though such a sensor is inexpensive, good measurements can be made even for the wavelengths concerned.

Advantageously, the receiving means comprise a single sensor and/or a single light source. The inspection device is simple and inexpensive to construct, and still guarantees an effective inspection.

Advantageously, the device comprises a housing designed to shield light rays other than those from the light source. In other words, an external cover prevents the ambient light from disturbing the measurement.

A second aspect of the invention relates to a method of inspecting a laser welding protective glass, comprising the steps consisting in:

placing the protective glass on an optical path between a light source, comprising for example an electroluminescent diode, and light receiving means, emitting a test light with the light source, measuring a quantity of the test light received by the light receiving means on a surface of at least 55 mm$^2$, calculating at least one transmission characteristic of the protective glass from the quantity of test light received by the receiving means, comparing the deduced transmission characteristic to a transmission threshold.

Advantageously, said at least one transmission characteristic is a transmission rate, and/or a transparency, and/or a surface area of an opaque point of the protective glass, and/or a total surface area of opaque points of the protective glass. For example, the opaque points can be spatter (projections solidified on the surface of the protective glass), or inclusions within the mass of the protective glass.

Advantageously, the inspection method comprises a preliminary step of reference measurement, consisting in emitting the test light onto the optical path without the protective glass, and in measuring the quantity of the test light received by the receiving means so as to establish a reference threshold of quantity of test light received. It typically involves making a measurement before and after the placement of the protective glass in order to limit the errors and aberrations of the material.

Advantageously, said reference measurement comprises a step consisting in maximizing a gain of a sensor of the receiving means. This makes it possible to place it within a measurement range with easily measurable values.

Advantageously, the sensor comprising a plurality of photosensitive surfaces designed to emit a signal representative of a quantity of light received, and said step consisting in maximizing the gain comprises a step consisting in varying an exposure time and/or an emission intensity of the light source so that the signal emitted by each photosensitive surface is at least 80% of a signal called full-scale of each photosensitive surface, preferably 89% of the full-scale signal, and more preferentially 93% of the full-scale signal.

Advantageously, the signal emitted by each photosensitive surface is strictly less than 100% of the full-scale signal.

Advantageously, said exposure time and/or said emission intensity is maintained constant for the subsequent measurements with the protective glass placed in the optical path.

Advantageously, said transparency is calculated by taking an average of the difference of the signal emitted by each photosensitive surface between the reference measurement and the test measurement.

Advantageously, the inspection method comprises a step consisting in placing the light source in operation, and wherein no measurement is made before a predetermined time, such as 30 minutes, or better still one hour, and/or before a measurement difference between two measurements made at constant test interval is not less than a predetermined difference, such as 0.5%, or better still, 0.1%.

Advantageously, the inspection method comprises a step consisting in emitting and/or filtering the test light in order to transmit to the receiving means only the light that has a wavelength between 855 nm and 1276 nm, preferably between 955 nm and 1170 nm, and still more preferentially between 1010 nm and 1110 nm, and very preferentially between 1040 nm and 1080 nm.

Advantageously, the inspection method comprises a step consisting in emitting and/or filtering the test light in order to expose the protective glass only to light that has a wavelength between 855 nm and 1276 nm, preferably between 955 nm and 1170 nm, and still more preferentially between 1010 nm and 1110 nm, and very preferentially between 1040 nm and 1080 nm.

Other features and advantages of the present invention will be seen more clearly from the following detailed description of an embodiment of the invention provided by way of a non-limiting example and illustrated by the appended drawings, wherein.

Figure 1:
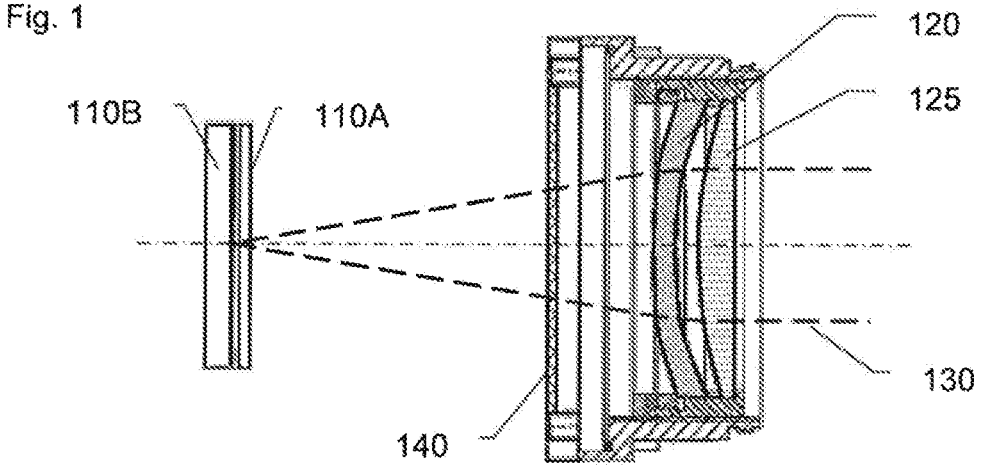
FIG. 1 shows a simplified view of a laser welding installation.

FIG. 1 shows two parts to be welded, 110A and 110B. For that purpose, a laser welder that comprises a laser source, for example a laser source of the Nd: YAG type, generates a laser beam 130 which is converged toward the welding zone of the parts 110A and 110B by lenses 120 and 125, and in particular a lens 120 that is the last one in the optical path of the laser beam 130 before the parts to be welded 110A and 110B.

The Nd: YAG (neodymium-doped yttrium aluminum garnet) laser typically emits light in a wavelength of about 1060 nm, and more precisely 1064 nm.

In order to properly protect the lens 120 from smoke and projections of material generated during the laser welding, a protective glass 140 is typically provided between the last lens 120 and the parts to be welded. This protective glass is than progressively covered by deposits and/or damaged (by the smoke, projections of hot and/or molten metal) and becomes progressively opaque, which alters the transmission properties of the laser beam 130, thus affecting the quality of the weld.

Figure 2:
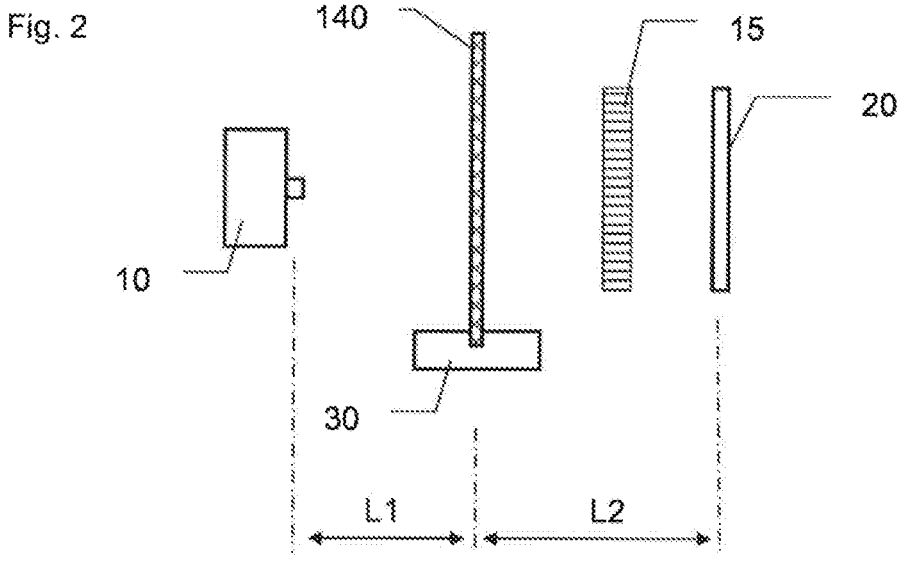
FIG. 2 shows a schematic view of a test device according to the invention.

FIG. 2 shows an inspection device of the protective glass 140, in order to verify whether said glass is capable of correctly transmitting the laser beam 130, before the first use thereof, or after a certain amount of time of use.

In particular, the protective glass 140 is placed between a light source 10 and receiving means 20, by means 30 for holding it in position.

In order to correctly quantify the transmission suitability of the protective glass 140, the invention proposes using an optical filter 15 and/or a light source 10 in order to make inspection measurements with light waves having characteristics close to those of the laser beam 130.

According to one advantageous embodiment, an optical filter 15 functioning as a bandpass filter, high-pass or low-pass (depending on the characteristics of the light spectrum of the light source 10) is used. The light transmitted by the optical filter has a wavelength between 855 nm and 1276 nm, preferably between 955 nm and 1170 nm, and still more preferentially between 1010 nm and 1110 nm, and very preferentially between 1040 nm and 1080 nm. The remainder of the light spectrum of the light source 10 is either absorbed or reflected but is not transmitted downstream of the optical filter 15.

Provision can be made to place the optical filter 15 as in FIG. 2, namely between the protective glass 140 and the receiving means 20. In particular, it can be provided to incorporate the optical filter on or in the sensor that typically forms the receiving means. However, alternatively or additionally an optical filter can also be provided between the light source 10 and the protective glass 140, which has the advantage of exposing the protective glass 140 only to the light having characteristics similar to the working light (the light of the laser beam 130).

In detail, an optical filter 15 bandpass can be provided with the following characteristics:

| Central wavelength (CWL) (nm): | 1050.00 | Tolerance of the Central Wavelength (nm): | ±2 |
|---|---|---|---|
| Width at Mid-Height FWHM (nm): | 12.00 | Tolerance of Max Width at Mid-Height FWHM (nm): | ±2 |
| Optical Density OD: | ≥4.0 | Effective aperture CA (mm): | 21.0 |
| Blocking Range (nm): | 200-Far IR | Diameter (mm): | 25.00 |
| Surface Quality: | 80-50 | Min. Transmission (%): | >70 |
| Thickness (mm): | 7.50 | | |

It will be noted that the filter above has a bandpass centered on 1050 nm, which is very close to the wavelength of a YAG laser (about 1060 nm) and provides results that are quite acceptable: it is possible to distinguish a non-conforming protective glass (that would produce a non-conforming laser weld in terms of depth of penetration, melt width, etc.), from a compliant protective glass.

As an alternative or in addition to the filter 15 described above, provision can be made to use a light source that generates light having a wavelength similar to that of the laser beam, namely equal to the wavelength of the laser beam at ±20% for example.

According to one advantageous embodiment, if the laser beam is of the YAG type, then the light source 10 emits a light the wavelength of which is between 855 nm and 1276 nm, preferably between 955 nm and 1170 nm, and still more preferentially between 1010 nm and 1110 nm, and very preferentially between 1040 nm and 1080 nm.

Very advantageously, the light source 10 comprises one or more electroluminescent diodes (LEDs), which makes it possible to generate the light easily without generating heat (which could cause the measurement characteristics to vary), and the emitted light can have a specific wavelength. For example, it could be considered to use electroluminescent laser diodes in order to generate a coherent light.

The receiving means 20 typically comprise a light sensor, for example a CMOS sensor that has sufficient measuring surface area to be able to take an image of a large part of the protective glass 140. In particular, the measured surface area of the protective glass 140 is at least 55 $mm^2$ for example, which makes it possible, in a measurement (or a photo), to quantify a significant surface area of the protective glass

7

140. A CMOS sensor has the advantage of being inexpensive. This type of sensor is not specifically defined to make the acquisition in the infrareds, but its low capacities in this frequency range are nevertheless efficient for the specific need of the device described.

According to an advantageous embodiment, the protective glass 140 is separated from the light source by a distance L1 falling within a range of values of 50 mm to 120 mm, and more preferentially from 70 mm to 100 mm.

According to an advantageous embodiment, the protective glass 140 is separated from the receiving means 20 by a distance L2 defined so as to allow a focusing of the receiving means on the protective glass 140, and in such a way that an image of the protective glass 140 on the receiving means 20 occupies at least 80% of the measuring surface, and preferentially at least 90% of the measuring surface of the light sensor. In other words, the photo taken by the light sensor at 80% should be an image of the protective glass.

Provision is also made to optimize the use of the receiving means 20 and of the light sensor used. It has been observed that it is advantageous to use the receiving means in such a way that they generate the greatest possible measuring signal.

For that purpose, prior to testing a protective glass, provision is made to carry out a step consisting in adjusting the light source 10 in order to generate the largest possible signal from the receiving means 20, without however being saturated.

In practice, the protective glass is not placed on the holding means 30, and the light source 10 is directly facing the receiving means 20. The light source 10 is placed in operation. Provision can be made first to allow the system to equilibrate (temperature increase, stabilization, etc.), and to make the first measurement only after 30 minutes to one hour after being turned on.

Next, still without the protective glass 140, a first measurement is made and the signal obtained from the light sensor is compared with the maximum signal thereof. If the signal obtained is weak, for example less than 80% or even less than 89% of the full-scale signal, then the light intensity of the light source 10 is increased until the signal received from the receiving means 20 is greater than the minimal limit, but the signal must strictly remain below the full-scale.

For example, if the light sensor comprises photosensitive surfaces (or pixels) the signal of which can vary between 0 and 255 (for example three types of photosensitive surfaces can be provided, each on one of three colors, red, green and blue), provision can be made to adjust the intensity of the light source 10 so that each of the photosensitive surfaces of the light sensor generates a signal between 225 and 255.

Upon completion of the calibration phase, it is then possible to move to the characterization of the transmission characteristics of the protective glass 140. A measurement is made before and after putting the protective glass 140 in place, and the following can then be characterized, for example:

Transparency, which can be calculated by taking the average of the signal difference for each photosensitive surface between the measurement before and after putting the protective glass 140 in place, divided by the signal without protective glass 140;

The size of each opaque point (or spatter) present on the protective glass 140, an opaque point being considered as a point where the signal from at least one photosensitive surface has decreased by more than 50% between the measurement before and after the protective glass 140 is put in place;

The total size of all the opaque points (or spatters) present on the protective glass 140.

For example, if the transparency is below 95% and/or if an opaque point exceeds 1.3 $mm^2$, and/or if the total surface area of the opaque points exceeds 2.5 $mm^2$, then the protective glass 140 can be considered as needing to be changed.

It will be understood that various modifications and/or improvements obvious to those skilled in the art may be made to the different embodiments of the invention described herein without going beyond the scope of the invention. In particular, mention is made of a Nd: YAG laser, but it is possible to use the inspection device and method for a protective glass of a $CO_2$ laser welder, i.e. laser sources that emit in the infrared, with their main wavelength band centered between 9.4 and 10.6 μm.

The invention claimed is:

1. A method of inspecting a laser welding protective glass, the method comprising:

operating a laser welder with a laser beam through a lens and the protective glass covering the lens, removing the protective glass from the laser welder, a preliminary step of reference measurement, including emitting a test light from an electroluminescent diode light source onto an optical path without a protective glass, and measuring a quantity of the test light received by a receiving device so as to establish a reference threshold of quantity of test light received, the receiving device including a sensor comprising a plurality of photosensitive surfaces designed to emit a signal representative of a quantity of light received, placing the protective glass on the optical path between the electroluminescent diode light source and the light receiving device, wherein the protective glass is separated from the electroluminescent diode light source within a range of 50 mm to 120 mm, emitting a test light having a light spectrum at least 80% of which has a wavelength between 855 nm and 1276 nm with the electroluminescent diode light source, measuring a quantity of the test light received by the light receiving device on at least 55 $mm^2$ of a surface of the protective glass, calculating a transparency of the protective glass from the quantity of test light received by the light receiving device compared to the reference threshold of quantity of test light received, wherein the transparency is calculated by taking an average of a difference of a signal emitted by each photosensitive surface between a reference measurement and a test measurement, and comparing the transparency to a transparency threshold, wherein if the transparency is below a predetermined percentage, the protective glass is changed on the laser welder.

2. The method of inspecting according to claim 1, wherein the reference measurement comprises maximizing a gain of a sensor of the receiving device.

3. The method of inspecting according to claim 2, wherein maximizing a gain comprises varying at least one of an exposure time and an emission intensity of the light source

US 12,594,621 B2

9

10 so that the signal emitted by each photosensitive surface is at least 80% of a signal called full-scale of each photosensitive surface.

4. The method of inspecting according to claim 3, wherein at least one of an exposure time and an emission intensity is maintained constant for the subsequent measurements with the protective glass placed in the optical path.

5. The method of inspecting according to claim 1, comprising placing the light source in operation, and wherein no measurement is made before a predetermined time, or before a measurement difference between two measurements made at constant test intervals is not less than a predetermined difference.

\* \* \* \* \*